Dec. 11, 1962  R. E. KLAUSS ET AL  3,067,848
PHOTOGRAPHIC PRINT CHOPPER CLUTCH MECHANISM
Filed Jan. 2, 1959  2 Sheets-Sheet 1

Ralph E. Klauss
Paul F. Sigl
INVENTORS

BY R. Frank Smith
Steve W. Grembow
ATTORNEYS

Dec. 11, 1962 R. E. KLAUSS ET AL 3,067,848
PHOTOGRAPHIC PRINT CHOPPER CLUTCH MECHANISM
Filed Jan. 2, 1959 2 Sheets-Sheet 2
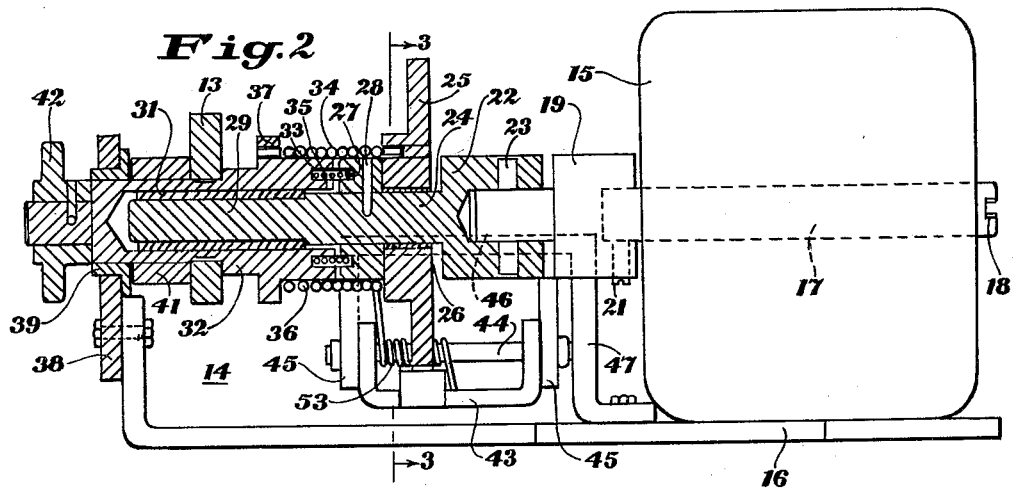
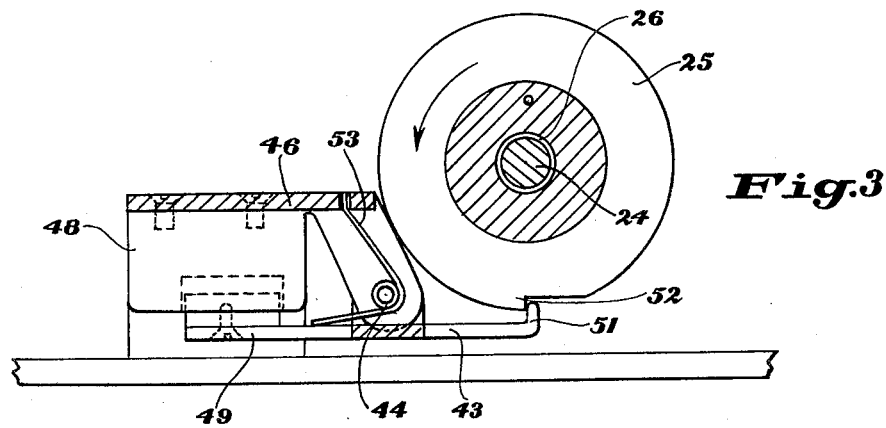
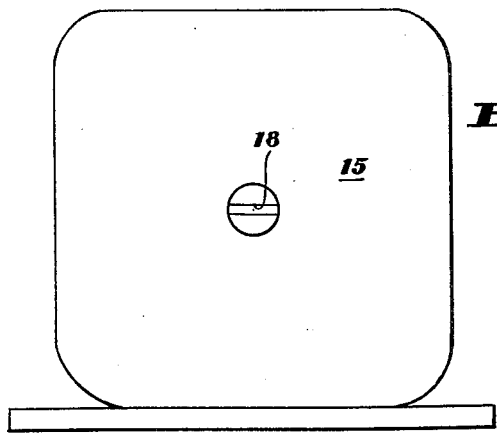
Ralph E. Klauss
Paul F. Sigl
INVENTORS
BY
ATTORNEYS

United States Patent Office

3,067,848
Patented Dec. 11, 1962

3,067,848
PHOTOGRAPHIC PRINT CHOPPER CLUTCH MECHANISM
Ralph E. Klauss and Paul F. Sigl, Rochester, N.Y., assignors to Eastman Kodak Company, Rochester, N.Y., a corporation of New Jersey
Filed Jan. 2, 1959, Ser. No. 784,570
1 Claim. (Cl. 192—48)

This invention relates generally to clutches, and more specifically to an improved photographic print chopper clutch mechanism for releasably connecting a constantly operating drive motor to an intermittently operated chopping apparatus.

Although the clutch mechanism of this invention may be capable of other applications, it is specifically designed for use in a photographic print chopper such as disclosed in U.S. Patent No. 2,742,963. In a print chopper of this type, the chopping apparatus is operated intermittently to chop the web into individual prints. In order to intermittently drive the chopping apparatus, many of the photographic print choppers are provided with an intermittently operated drive motor connected to the chopping apparatus. The disadvantage of a drive system of this type is that the number of prints produced per unit time is not very large, and the drive motor tends to overheat presenting cooling problems, loss in efficiency and reduced motor life. These disadvantages are eliminated by the improved clutch mechanism of this invention which releasably connects a constantly operating drive motor to a driven member such as a chopping apparatus.

Therefore, the primary object of the present invention is to provide an improved clutch mechanism for a photographic print chopper for connecting a constantly operating drive motor to an intermittently operated chopping apparatus.

Another object is to provide an improved clutch mechanism for a photographic print chopper adapted to selectively connect a drive motor to an intermittently operated driven member for driving it in one direction, and adapted if the driven member should become jammed to drive the driven member in the opposite direction to clear the jam.

One more object of the invention is to provide an improved clutch mechanism having a pair of oppositely wound clutch springs for driving a driven member in either direction and in which one of the springs is completely enclosed within an annular cavity.

Still another object is to provide an improved clutch mechanism for a photographic print chopper that is of simple design and construction, thoroughly reliable and efficient in operation, and economical to manufacture.

Objects and advantages other than those set forth above will be apparent from the following description when read in connection with the accompanying drawings, in which:

FIG. 2 is an enlarged sectional view taken substantially on line 2—2 of FIG. 1, and showing a clutch mechanism constructed according to a preferred embodiment of the invention;

FIG. 3 is a section view substantially taken along the line 2—2 of FIG. 2 and

FIG. 4 is an end view of the drive mechanism of FIG. 2.

Figure 1:
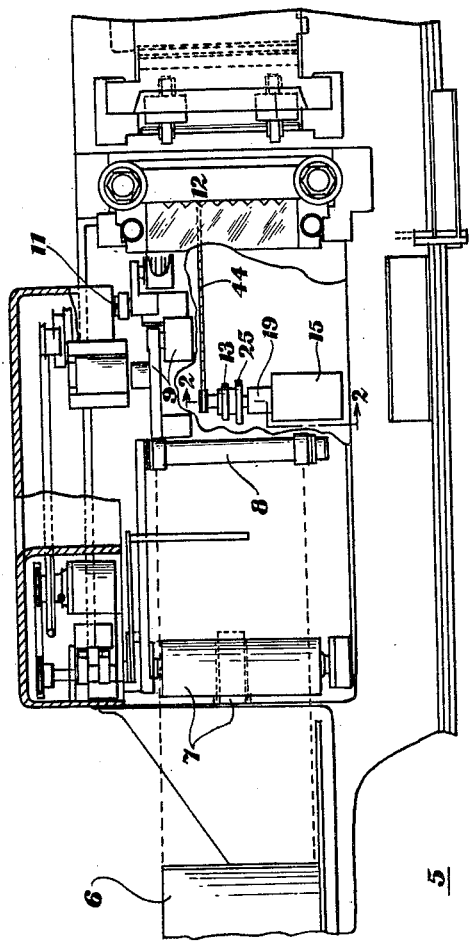
FIG. 1 is a top plan view, with certain parts of the supporting member broken away, of a photographic print chopper in which the present invention is embodied.

As shown in the drawings, a preferred embodiment of this invention is illustrated as applied to a photographic print chopper having a roll of processed prints placed on a supply spindle 6. The strip of prints is fed through a pair of constantly driven metering rolls 7 into a free loop over a guide bar 8, and then through an intermittent feeding and braking mechanism 9 which periodically feeds the strip from the free loop over a pick-up or detector station 11 and then between the knives of a chopping apparatus 12. The passage of a conducting mark on the strip over the detector 11 completes a control circuit which stops the intermittent feed and applies a brake to the strip in front of the loop and actuates the chopping apparatus 12 to chop off a print. Just as soon as the cutter 12 completes its cutting stroke, the control circuit is reset by an intermittently driven cam 12 to again start the intermittent feed of the strip. When the next conducting mark on the strip of prints passes the detector station 11, the intermittent feed is again stopped and the chopping apparatus 12 actuated again to cut the next print, etc. A print chopper 1 of the type described is shown in detail in U.S. Patent No. 2,742,963.

The clutch mechanism 14 of this invention has been designed specifically for use in a photographic print chopper 1 of the general type described. The drive mechanism for the print chopper 1 comprises an electric motor 15 mounted on a fixed support 16. The motor 15 in this application is a motor having a drive shaft 17 adapted to rotate at approximately 300 revolutions per minute. The drive shaft 17 has a slot 18 at one end for a purpose to be explained hereinafter, and its opposite end is secured to a coupling 19 by a set screw 21. The coupling 19 further receives one end of a stub shaft 22 which is secured thereto by a pin 23. The stub shaft 22 has a cylindrical portion 24 for rotatably supporting a clutch disk 25. To facilitate rotation of disk 25 with respect to stub shaft portion 24, a bearing 26 is interposed therebetween. The stub shaft portion 24 further also supports an annular member 27 which is fixed thereto by a pin 28. The stub shaft 22 further has another cylindrical portion 29 adjacent to portion 24 and of smaller diameter for carrying a bushing 31 which supports a driven shaft 32. The driven shaft 32 has an annular groove 33 at one end in register with an annular groove 34 in member 27 to form an enclosed annular cavity for receiving a closely-wound, righthand helical spring 35 which in the untensioned position frictionally grips the portions of shaft 32 and member 27 which it encircles. Another closely-wound, left-hand helical spring 36 encloses the outer ends of annular member 27 and driven shaft 32, and has one end fixed to disk 25 and the opposite end being fixed to a peripheral flange 37 formed on driven shaft 32. A flange 38 is secured to the support member 16 and has a bearing 39 for receiving and supporting driven shaft 32. An annular spacer element 41 is loosely mounted on driven shaft 32 and interposed between cam 13 and bearing 39. A drive sprocket 42 is pinned to one end of driven shaft 32 for driving the intermittently operated chopping apparatus 12 by means of an endless chain 44 as seen in FIG. 1. As indicated earlier, cam 13 which is secured to driven shaft 32 intermittently resets the control circuit after each operation of the chopping apparatus 12. The chopping apparatus 12 and control circuit are only referred to generally since they do not form a part of the invention, and a more specific and detailed description of this structure appears in the aforementioned Patent No. 2,742,963.

A latch for clutch disc 25 comprises a lever 43 pivotally mounted intermediate its ends on a rod 44 supported by spaced-apart, depending flanges 45 formed by a solenoid support bracket 46. The bracket 46 has a leg 47 which is rigidly secured to support member 16. A solenoid 48 is secured to bracket 46, and is adapted when energized to draw one end 49 of lever 43 upwardly withdrawing a hook 51 formed by the opposite end from a cooperating peripheral shoulder 52 formed by disk 25. The lever 43 is normally biased in a counterclockwise direction as seen in FIG. 3 by a helical spring 53 causing hook 51 to ride on the periphery of disc 25 to engage shoulder 52 thereon. The helical spring 53 encircles rod 44 and has one end bearing against lever 43 and the opposite end projecting into an opening of bracket 46.

In the operation of this invention, let us assume initially that drive motor 15 is connected to a source of power and latch 51, 52 is in an engaged position. In this position, clutch disk 25 prevents clutch spring 36 from constricting and drivingly connecting the constantly rotating annual member 27 to driven shaft 32. Also, clutch spring 35 enlarges by virtue of the manner in which it is wound and the direction of rotation of member 27 to disconnect member 27 from driven shaft 32. Consequently, in this position, driven shaft 32 remains stationary. When it is desired to drive driven shaft 32 and chopping apparatus 12 connected thereto, solenoid 48 is momentarily energized by the control circuit or any other suitable actuating system for a time duration sufficient to withdraw hook 51 from shoulder 52. As soon as disk 25 is released by hook 51, clutch spring 36 constricts drivingly connecting the constantly rotating annular member 27 to driven shaft 32 which rotates therealong. When disk 25 completes one revolution, hook 51 which is released by solenoid 48 and urged by spring 53 into engagement with the periphery of disk 25 reengages shoulder 52 stopping further rotation of disk 25 and causing clutch spring 36 to enlarge effectively disconnecting member 27 from driven shaft 32. As mentioned earlier, cam 13 which is turned through one revolution along with driven shaft 32, resets the control circuit in preparation for another cycle. Should driven shaft 32 be stopped after latch 51, 52 is disengaged for any reason such as the chopping apparatus 12 jamming etc. drive motor 15 will stall and must be automatically or manually shut off. A screwdriver or similar tool may then be used to engage slot 18 of drive shaft 17 for rotating drive shaft 17 in a direction opposite to its normal direction of rotation. With shaft 17 rotated in this direction, spring 36 enlarges to declutch member 27 from shaft 32, and spring 35 constricts drivingly connecting member 27 to driven shaft 32 causing shaft 32 to be rotated in a direction opposite to its normal direction of rotation backing up the chopping apparatus 12 so that the obstructions may be removed. As soon as the difficulty has been eliminated, drive motor 15 may once again be actuated for driving shaft 17 and member 27 in the normal direction of rotation. During this operation as explained earlier, spring 35 enlarges to declutch annular member 27 from shaft 32.

The invention has been described in detail with particular reference to the preferred embodiments thereof, but it will be understood that variations and modifications can be effected within the spirit and scope of the invention as described hereinabove and as defined in the appended claim.

We claim:

In a clutch mechanism for connecting a drive member to a driven member for intermittent rotation of said driven member in one direction upon rotation of said drive member in said one direction, and uninterrupted rotation of said driven member in the opposite direction upon rotation of said drive member in the opposite direction, the combination comprising:

(A) a drive member having first and second adjacent cylindrical portions of different outside diameters, (B) an annular member element encircling said first portion and secured thereto,
  (a) said element having an outer peripheral surface and a first axially extending annular groove concentric with its axis and outer surface, (C) a disk adjacent said element and rotatably mounted on said first portion, (D) a driven member axially aligned with said drive member and having an axial bore at one end thereof for receiving said second portion,
  (a) said one end of said driven member being rotatably mounted on said second portion,
  (b) said one end of said driven member having an outer peripheral surface having an outside diameter equal to the outside diameter of said outer peripheral surface of said annular element,
  (c) said one end of said driven member further having an axially extending annular groove in register with said first groove to form an enclosed annular cavity in axial registry with said outer peripheral surfaces and radially spaced from said axis a lesser amount than said outer surfaces, (E) a first helical spring wound in a fixed direction encircling the outer peripheries of said element and said end of said driven member and having one end of said spring secured to said disk and its opposite end secured to said one end of said driven member, (F) a second helical spring wound opposite to said fixed direction disposed in said annular cavity and encircling and embracing parts of said element and said one end of said driven member, and (G) a latch for releasably holding said disk against rotation and adapted,
  (a) when latched to disconnect said drive and driven members upon rotation of said drive member in said one direction,
  (b) when released to cause said first helical spring to drivingly connect said drive and driven members for driving said driven members in one direction upon rotation of said drive member in said one direction,
  (c) said drive member when rotated in the opposite direction causing said second helical spring to drive said driven member in said opposite direction.

References Cited in the file of this patent

UNITED STATES PATENTS

| | | |
|---|---|---|
| 1,629,420 | Starkey | May 17, 1927 |
| 2,458,612 | Luzatto et al. | Jan. 11, 1949 |
| 2,475,432 | Marihart | July 5, 1949 |
| 2,575,012 | Harvey | Nov. 13, 1951 |
| 2,742,126 | Morton | Apr. 17, 1956 |
| 2,794,524 | Sacchini et al. | June 4, 1957 |
| 2,833,383 | Christensen | May 6, 1958 |